United States Patent [19]
Katz

[11] Patent Number: 5,073,929
[45] Date of Patent: * Dec. 17, 1991

[54] VOICE-DATA TELEPHONIC CONTROL SYSTEM

[75] Inventor: Ronald A. Katz, Los Angeles, Calif.

[73] Assignee: First Data Resources Inc., Omaha, Nebr.

[*] Notice: The portion of the term of this patent subsequent to Dec. 20, 2005 has been disclaimed.

[21] Appl. No.: 312,792

[22] Filed: Feb. 21, 1989

Related U.S. Application Data

[63] Continuation-in-part of Ser. No. 194,258, May 16, 1988, Pat. No. 4,845,739, which is a continuation-in-part of Ser. No. 18,244, Feb. 24, 1987, Pat. No. 4,792,968, which is a continuation-in-part of Ser. No. 753,299, Jul. 10, 1985, abandoned.

[51] Int. Cl.$^5$ ............... H04M 1/64; H04M 11/00
[52] U.S. Cl. ............................ 379/93; 379/88; 379/97
[58] Field of Search ............ 379/93, 92, 88, 89, 379/67, 97, 77, 80

[56] References Cited

U.S. PATENT DOCUMENTS

| | | | |
|---|---|---|---|
| 4,320,256 | 3/1982 | Freeman | 379/73 |
| 4,645,873 | 2/1987 | Chomet | 379/93 |
| 4,757,267 | 7/1988 | Riskin | 379/113 |
| 4,815,121 | 3/1989 | Yoshida | 379/67 |
| 4,827,500 | 5/1989 | Binkerd et al. | 379/88 |
| 4,894,857 | 1/1990 | Szlam et al. | 379/92 |
| 4,896,345 | 1/1990 | Thorne | 379/67 |

OTHER PUBLICATIONS

Katz, Statistical Analysis System for Use with Public Communication Facility, Int'l. Pub. Date: 1/15/87, No. WO 87/00375.

Primary Examiner—Jin F. Ng
Assistant Examiner—Stella L. Woo

[57] ABSTRACT

In an audio-digital telephone interface system, a control selectively prompts a caller with oral instructions to selectively provide: control signals, digital data signals (numeric) or audio signals. A data cell is loaded in accordance with an operating program of the control and the resulting data packet is classified, as depending on the presence of audio signals. Data packets are returned to storage, as for subsequent off-line processing. The illustrative format receives and organizes mail order data from callers.

19 Claims, 3 Drawing Sheets

VOICE-DATA TELEPHONIC CONTROL SYSTEM

This is a continuation-in-part of application Ser. No. 194,258 filed May 16, 1988 and entitled "Telephonic-Interface Statistical Analysis System", issued July 4, 1989 as U.S. Pat. No. 4,845,739, which was a continuation-in-part of application Ser. No. 018,244 filed Feb. 24, 1987 and entitled "Statistical Analysis System For Use With Public Communication Facility", issued Dec. 20, 1988 as U.S. Pat. No. 4,792,968, which was a continuation-in-part of application Ser. No. 753,299 filed July 10, 1985 and entitled "Statistical Analysis System For Use With Public Communication Facility", now abandoned.

BACKGROUND AND SUMMARY OF THE INVENTION

As the use of computer techniques has steadily grown, related telephonic communication techniques also have expanded. In that regard, telephone systems have been developed for effectively transmitting digital data in forms commonly utilized by computer apparatus. At a more personal level, the traditional push buttons of telephone instruments have been utilized to provide digital signals at a remote location for both data and control functions. Consequently, various operations have been performed.

In the typical operation of a telephone instrument as a digital input device, voice messages prompt callers to provide data and control signals by actuating the alphanumeric buttons of a conventional telephone. Detailed forms of such systems have been proposed in association with computers to provide various services and one such system is disclosed in U.S. Pat. No. 4,792,968 issued Dec. 20, 1988, to Ronald A. Katz from an application Ser. No. 07/018,244 filed Feb. 24, 1987.

Although traditional systems for interfacing an individual person at a telephone terminal with a computer or data processor have been effective, such systems have been somewhat limited in application. In general, the present invention is based on recognizing the need in such systems to accommodate voice signals as to provide recorded audio data. Accordingly, the system of the present invention accommodates a caller to provide: digital control signals, digital data signals and audio signals, all in an organized format as to accomplish a record for off-line processing.

To consider a specific example, systems have been proposed in the past for interfacing individual telephone terminals with computers for sales applications. For example, individual callers might dial to accomplish an interface, then provide ordering data by actuating the telephone terminal buttons. One such system is disclosed in a co-pending related patent application entitled "Telephone Interface Statistical Analysis System", filed May 16, 1988, and bearing a Ser. No. 07/194,258 and a related prior application, now U.S. Pat. No. 4,792,968. In the use of such systems, the need is recognized for improved capability regarding audio data.

In general, the present invention comprises a telephone computer interface system accommodating digital and vocal telephonic communication, the system being expanded to accommodate and flag audio data distinct from digital data. In using the disclosed system, an individual actuates a remote telephone terminal to attain an interface with a central system. Depending on the course of communication during the interface, various states are implemented. Somewhat conventional operation may involve vocal communications to the caller and digital communications from the caller. However, in an alternative state, on cue, vocal or audio data may be received from the caller. Generally, data received from the caller is set in memory for subsequent off-line processing. Thus, the system accommodates flexible control and data accumulation (including cued audio) to accommodate any of various specific interface applications or formats.

BRIEF DESCRIPTION OF THE DRAWINGS

In the drawings, which constitute a part of this specification, an exemplary embodiment exhibiting various objectives and features hereof is set forth. Specifically.

DESCRIPTION OF THE ILLUSTRATIVE EMBODIMENT

As required, a detailed illustrative embodiment of the present invention is disclosed herein. However, physical communication systems, data formats and operating structures in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
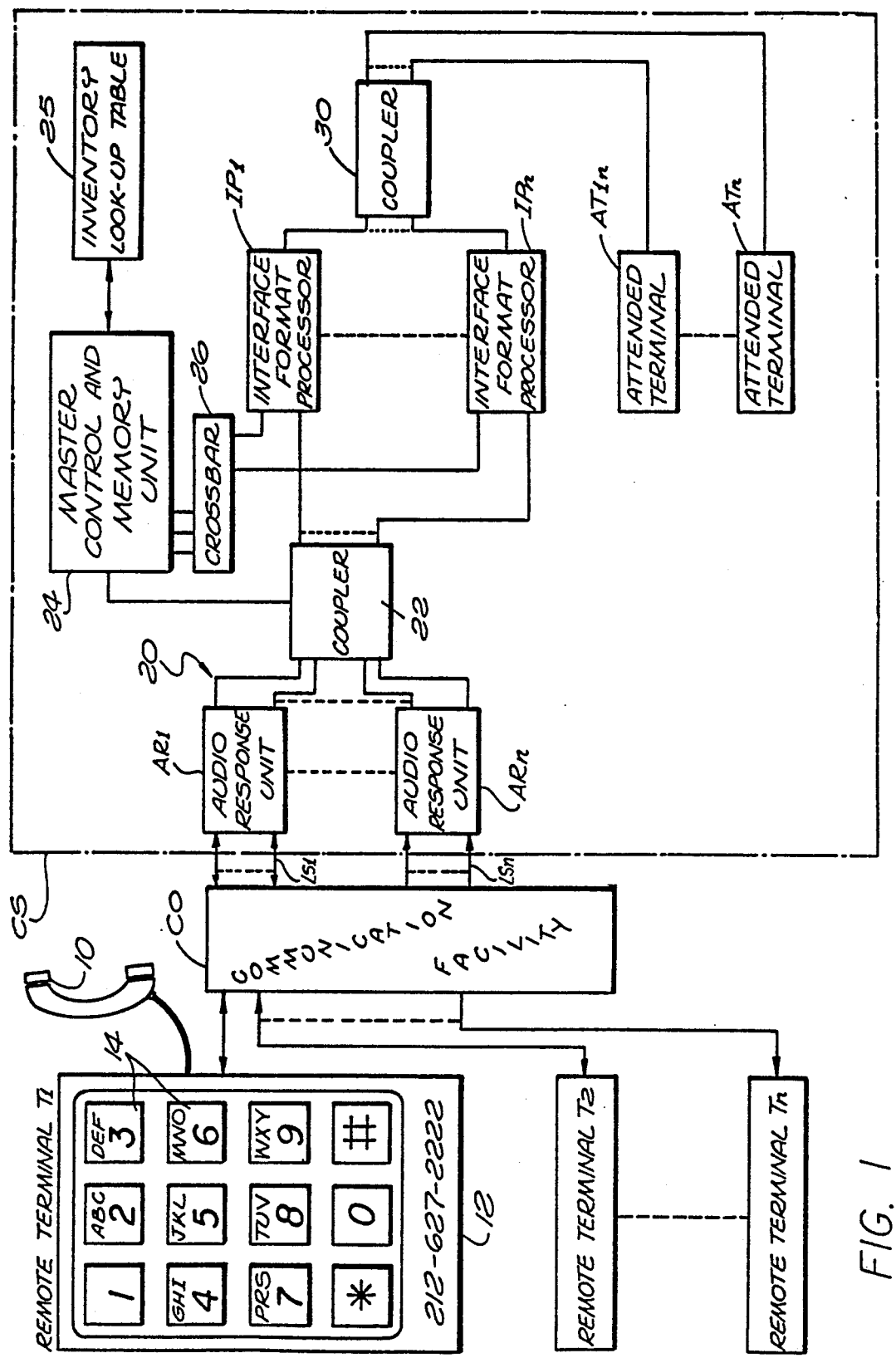
FIG. 1 is a block diagram of a system constructed in accordance with the present invention.

Referring initially to FIG. 1, a series of remote terminals T1-Tn (telephone instruments) are represented (left). The terminals T1-Tn may be similar and accordingly only the terminal T1 is shown in any detail. The indicated terminals T1-Tn represent the multitude of telephone terminals existing in association with a communication facility CO which may comprise a comprehensive public telephone network.

The communication facility CO, accommodating the individual terminals T1-Tn, is coupled to a central processing station CS generally indicated by a dashedline block. Functionally within the station CS as illustrated, processors are provided to interface the terminals T1-Tn so as to accomplish a desired operating format, as to accumulate data for individual callers.

Calls from the terminals T1-Tn are individually processed in accordance with a specific format to accomplish a data cell or packet. For example, the objective of the call may be to order an item of merchandise that is to be sent to the caller, thus implementing a mail-order operation. Accordingly, the interface accomplishes data as a cell for processing the order. In other formats, the system may function, for example, in such applications as: public polls, lotteries, auctions, promotions and games.

At any instant of time, the collective interface involving the communication system CO and the processing station CS may involve several thousand calls. Accordingly, the station CS may take the form of a sizeable computer or mainframe capable of simultaneously controlling smaller units or directly operating to process many calls involving individual interfaces. Although numerous possible configurations are available, for purposes of explanation, the central station CS of the disclosed embodiment includes a plurality of audio response units and associated individual processors.

Essentially, the system of the present invention accumulates data in cells from the remote terminals T1-Tn which data may include audio data and digital data (numerical) flagged or otherwise distinguished for subsequent expedient processing. Accordingly, the system enables a caller to provide data in both audio and digital forms. For audio transmissions, the caller utilizes the telephone handpiece (microphone) while for digital communications, the caller utilizes the telephone push buttons.

Considering the system of FIG. 1 in greater detail, the exemplary telephone terminal T1 includes a handpiece 10 (microphone and earphone) and a panel 12 provided with a rectangular array of individual push buttons 14 in a conventional configuration. Of course, the handpiece 10 accommodates analog signals while the panel 12 is a digital apparatus. As disclosed in detail below, a caller is cued through the handpiece 10 (earphone) to provide data in accordance with a specific format. In accordance herewith, the caller may provide data utilizing either the buttons 14 or the handpiece 10 (microphone).

In conventional telephone structures, alphabetic and numeric designations are provided on the buttons 14. For example, several of the buttons 14 carry three letters along with a decimal digit. Specifically, the button designated with the numeral "2" also carries the letters "A", "B" and "C". Thus, the buttons 14 encompass: the numerals "0-9", the symbols "*" and "#" and the alphabet except for the letters "Q" and "Z".

At this stage, some specific aspects of the communication interface are noteworthy. Essentially, by telephonic dialing, the communication facility CO couples selective of the terminals T1-Tn to audio response units AR1-ARn. For example, as a result of dialing a specific telephone number at one of the remote terminal units T1-Tn, the communication facility CO couples the actuated terminal through one line of several sets of lines LS1-LSn to one of the audio response units AR1-ARn.

From the audio response units AR1-ARn, incoming lines 20 are received through a coupler 22 for communication with individual interface format processors IP1-IPn. Note that the interface processors IP1-IPn are illustrated as separate and distinct units; however, as mentioned above, it is to be recognized that various structural processing combinations based on time sharing, parallel processing, compiler techniques, bus technologies and other well known computer techniques may be employed to accomplish the objective processing as explained in detail below. The structure and functions of the processors IP1-IPn also can be variously incorporated in the units AR1-ARn. Of course, specific arrangements and configurations will likely be implemented based on available hardware and software development.

The coupler 22 is also connected to a master control and memory unit 24 which is associatively coupled to a look-up table 25 and through a crossbar 26 to each of the processors IP1-IPn. Note that both the function and structure of crossbars for selectively interconnecting multiple parallel structures are well known in the computer arts. For a detailed description of crossbars, see the book, "High-Performance Computer Architecture" by Harold S. Stone, published by AddisonWesley Publishing Company, 1987.

The coupler 22 essentially functions as a switch as well known in the prior art to establish line couplings from one line of an audio response unit (AR1-ARn) to one of the interface processors IP1-IPn. The operation of the coupler 22 is implemented in association with the unit 24 which may be programmed to execute control and memory functions as detailed below. Again, the division of functions between the unit 24, the units AR1-ARn and the processors IP1-IPn may vary considerably depending on available structures and techniques, however, the disclosed system is merely exemplary in that regard.

Generally, the interface processors IP1-IPn receive basic record data from the unit 24 and order data from the terminals T1-Tn. In a multiple format configuration, program data may be stored in the processors IP1-IPn or supplied from the unit 24. In any event, in accordance with a program or format, a packet of data is collected in a processor IP1-IPn during an interface. After being organized in a cell and flagged, the data packet is returned from an interface processor IP1-IPn to the unit 24 for subsequent off-line processing.

In the case of a mail-order operating format, individual cells or packets of data are organized and returned to the unit 24 for the processing which ultimately involves shipping merchandise and billing recipients. In some operating formats, during the course of interfaces with certain callers, the need may arise for person-to-person oral communication. In accordance herewith, to accommodate that need, the interface processors IP1-IPn may be individually associated through a coupler 30 with an attended terminal AT1-ATn.

Recapitulating to some extent, the general operation of the system of FIG. 1 involves the development of individual data packets or cells within the individual processors IP1-IPn, based on interface communications with individual remote terminals T1-Tn. In the exemplary format as treated below, each data cell manifests a merchandise order identifying specific goods, a specific customer, a shipping destination and other related data. In accordance herewith, data in individual cells may include audio data. In any event, the operation of the system involves the organized accumulation of mail-order data (some of which may be audio) in the unit 24 for subsequent processing (some of which may be off-line) to implement billing and the delivery of merchandise.

Figure 2:
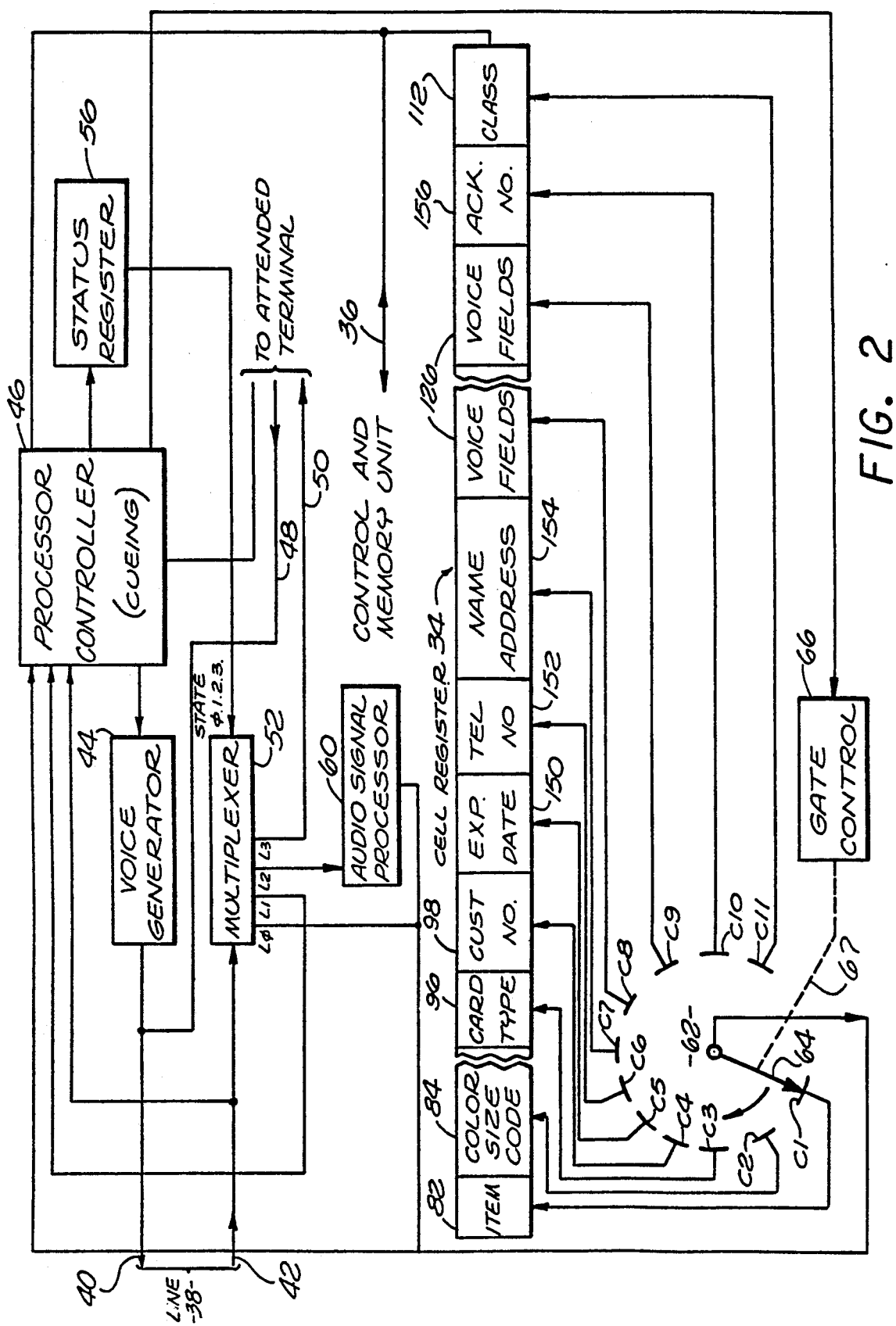
FIG. 2 is a block and schematic diagram of a component in the system of FIG. 1.

As explained in detail below, the data cells (manifesting individual orders) are developed in the individual processors IP1-IPn. Structural details of an exemplary processor are shown in FIG. 2 and will now be considered. A cell register 34 (FIG. 2, center) is divided into fields to illustrate the data format. Specifically, the cell register 34 defines several separate fields for data components manifesting an individual order. Record data for some of the fields may reside in the master control and memory unit 24 (FIG. 1) before the occurrence of a telephone interface. However, other fields are loaded during the period of the interface with a caller at one of the remote terminals T1-Tn providing elements of the data.

Generally, available record data is initially loaded into the cell register 34 from the control and memory unit 24 (FIG. 1) through a bus 36 (FIG. 2, right center) that is connected to the crossbar 26 (FIG. 1). The same bus 36 accommodates movement of a completed data cell to memory (in the unit 24).

As suggested above, some fields in the cell register 34, as those pertaining to a specific merchandise order, are always loaded by data resulting from the interface and received through a line 38 (FIG. 2, upper left). That is, a caller is steered through the interface interval, being prompted to provide responses selectively in the form of: (1) digital control signals, (2) digital data signals or (3) audio signals. Generally, the control signals in the line 38 are utilized for the controlled registration of digital data signals and audio signals as appropriate to each specific interface. Of course, the data and audio signals are also received in the line 38.

For convenience of illustration and explanation, the line 38, tied to the coupler 22 (FIG. 1) is shown to include two separate communication paths, specifically an outgoing path 40 and an incoming path 42. Of course in practice, the two paths would comprise a common line.

The outgoing communication path 40 is provided with cueing signals from a voice generator 44 which is, in turn, controlled by a processor controller 46. Generally, the controller 46 may possess some substantial computing capability along with storage and it responds to an operating program as disclosed in detail below to accomplish interface data in accordance with various alternative possibilities.

The outgoing communication path 40 of the line 38 is also tied to one of the attended terminals AT1-ATn. The signal in FIG. 2 is to the path 40 from a line 48 and the voice generator 44. From the path 42 signals are provided through a multiplexer 52 to a line 50 and to the controller 46. As indicated above and explained in detail below, under various circumstances, signals from terminal callers are variously transferred, including transfer to an attended terminal (AT1-ATn, FIG. 1). Thus, the status of an interface may vary, one status or state being an interconnection of one of the remote terminals T1-Tn with an attended terminal, that is, one of the terminals AT1-ATn.

The status of an interface with a caller is indicated by a status register 56 (FIG. 2, upper right) which is controlled by the process controller 46 and in turn controls the multiplexer 52. The status register 56 basically comprises a two-bit counter capable of indicating four states to control lines L0-L3 from the multiplexer 52, as indicated below.

| State | Operation | Active Multiplexer Line |
|---|---|---|
| "0" | Cue data signals (digital) | L0 |
| "1" | Cue control signals (digital) | L1 |
| "2" | Cue audio signals | L2 |
| "3" | Actuate live interface | L3 |

The states "0", "1" and "2" indicate operations to prompt the caller to provide signals digitally. In the state "3", the caller speaks directly with an operator to provide information in an audio form. To implement the different states, the multiplexer 52 (controlled by the status register 56) selectively activates one of the four lines L0, L1, L2 or L3 to receive signals from the path 42.

Generally, the control signals received in the line L1 are applied to actuate the controller 46. The data or information signals received in the lines L0 and L2 are provided to the cell register 34 through a gating network 62 (lower left). Several connections are involved.

The line L0 (digital data) is connected to the controller 46 and to a movable contact 64 of the gating network 62. The line L2 (audio) is connected through an audio processor 60 in a similar manner, i.e. to the controller 46 and to the movable contact 64. The line L1 (control) is connected to the controller 46 and the line L3 (audio) is connected to a line 50 to terminate at a terminal (AT1-ATn) when operative.

The gating network 62 is illustrated in an electromechanical form for ease of explanation with the movable contact 64 displaceable to engage each of the stationary contacts C1-C11. However, in an actual embodiment, a well known analogous electronic configuration would be employed.

In accordance with the symbolic representation of the gating network 62, the movable contact 64 is driven by a gate control 66 to sequentially encounter stationary contacts C1-C11, which in turn are coupled to fields of the register 34. A mechanical drive connection is indicated by a dashed line 67, the gate control 66 being actuated by the process controller 46 as described in detail below. Somewhat more specifically, the operations directed by the controller 46 are illustrated in FIG. 3 and will now be considered in detail.

Figure 3:
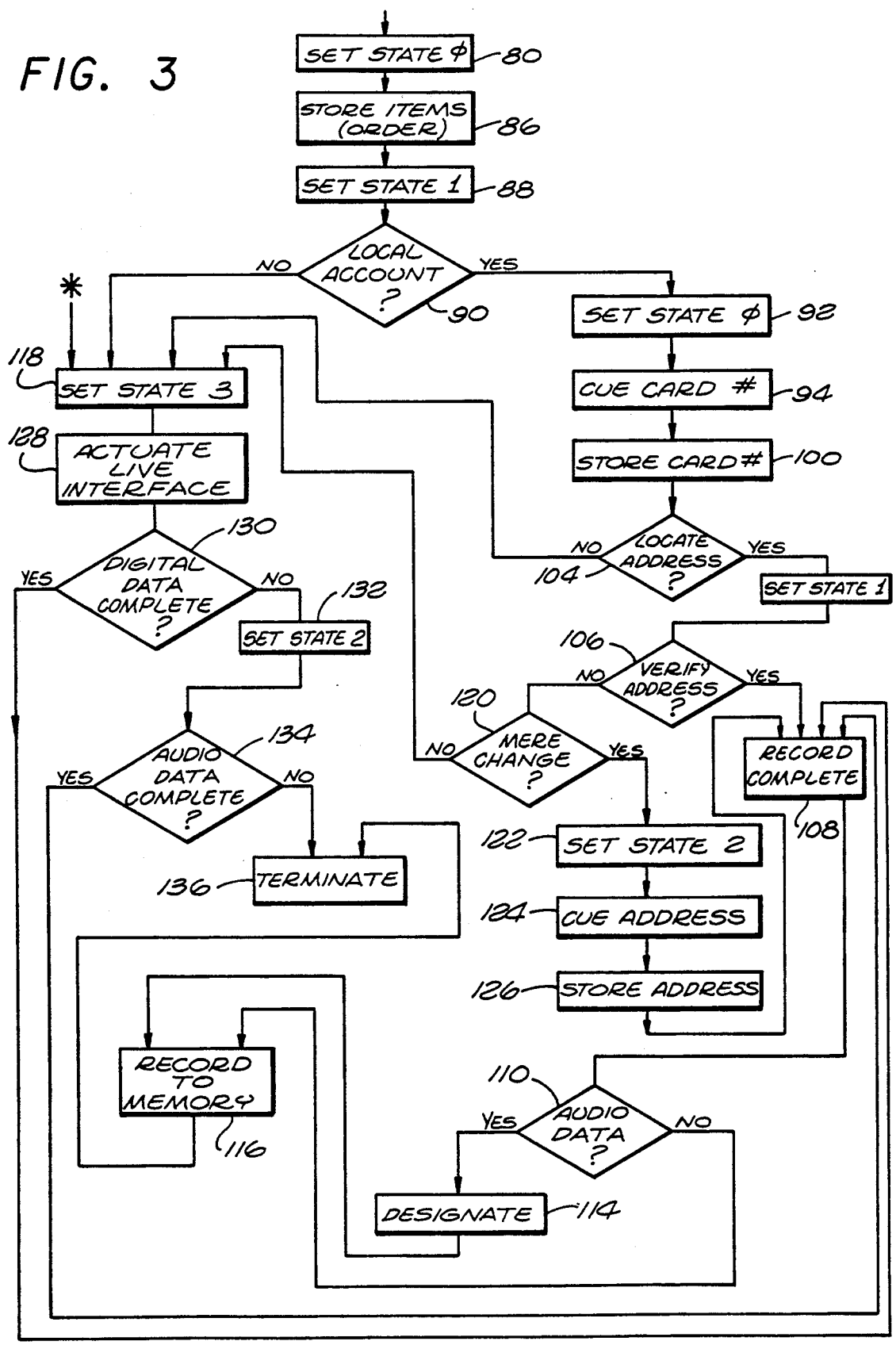
FIG. 3 is a flow diagram illustrating the operating process of the structure represented in FIG. 2.

The flow diagram of FIG. 3 implements an exemplary mail-order format for a sales organization with existing "local" customers of record (identified by credit card number) acceptable for credit transactions. Initially, the system is set to state "0" as indicated by the block 80. In that state, a caller is cued for digital data to be formed as signals by use of 25 the buttons 14 at the caller's remote terminal. Specifically, the caller might be cued: "Please indicate your first item by keying in the three-digit catalog number."

As will be described in detail below, identification for an item is stored in a field 82 (FIG. 2) of the cell register 34. Similarly, color, size and code data for selected items are cued and stored in a field 84. Of course, other items may be ordered with the consequence that they are recorded in the fields 82 and 84 of the cell register 34. The operation also is indicated by the block 86 in FIG. 3 and might be cued: "Please indicate your next item or push button '3' to indicate you are finished."

At the conclusion of the item ordering, the system sets state "1" (cue control) as indicated by block 88 (FIG. 3). Note that the state "1" also may be attained by a period of silence from the caller. In any event, the subsequent operation involves a junction, as indicated by the block 90, the determination being made by whether or not the caller is a customer of record, e.g. "local account?" As an example, the caller might be cued: "If you have a local account, please push button 1; if not, please push button 2." The resulting control signals set the course for subsequent operations.

If a caller has a local account, the system is reset to state "0" (cue data) as indicated by block 92. In that event, the system resumes the accumulation of data by cueing for the card number as indicated by the block 94. Note that with the indication of a local account, a designating code (customer I.D. number) is set in the field 98 of the cell register. Concurrently, the expiration date for the customer's account or card is stored in the field 150. These operations are indicated by the block 100 (FIG. 3).

Pursuing the example, the system is again set in state "1" to cue for control signals as indicated by the block 104 (FIG. 3). Specifically, as indicated by a junction block 104, a search is made for the customer's identification number. If the number is found, another control signal is cued. Specifically, as indicated by the block 106, the customer's address is verified. If the proper address is confirmed to be registered for the customer, the record is completed as indicated by the block 108. This operation may involve inventory verification or other internal operations as described in detail below. Thereafter, the system operation progresses to an internal decision block 110 to test whether or not audio data has been received. Essentially, the audio test simply queries whether or not the status register 56 has been set to manifest the existence of the states "2" or "3" to enter audio data. Control in that regard is by the controller 46 (FIG. 2). In the example as treated to this point, neither states "2" or "3" has occurred. However, depending on the determination, a field 112 (FIG. 2) of the cell register 34 is set with one of the two possibilities. If audio data had been entered, the block 114 would indicate a class designation of binary "1" in the field 112. Conversely, a class representative "0" is entered in the field 112 for the order involving no audio data. The operation next proceeds to record the loaded cell in memory as indicated by the block 116.

The operation as outlined to this point has covered routine orders, i.e. customers with open accounts placing orders that can be processed entirely on the basis of control signals and data signals entered digitally as outlined above. The accommodation of other orders involving audio communication will now be considered.

Generally, audio operations involve either the introduction of a person-to-person interface, as for example for a new customer, or upon the need to register audio data, as for example with a new address for an existing customer. These operations may be actuated variously in combination with digital number data. Such operations may involve proceeding through a block 118 (FIG. 3, upper left); however, other possibilities exist. One such possibility occurs when a caller indicates that his record address is not correct. Specifically in that regard, the junction block 106 (FIG. 3, right center) queries "verify address?" The cue or prompt might take the form: "According to our records, you are Mr. John Henry with a billing and shipping address of 10 Beverly, Los Angeles, Calif." A "no" response results in another test as indicated by the block 120 questioning whether or not the present situation is merely a case of an altered address. If so, the system proceeds from a "yes" determination of the block 120 to obtain an audio record of the new address. As indicated by the block 122, state "2" is set and the caller is cued to state his new address as indicated by the block 124. The address is stored as audio data as indicated by the block 126. The operation then proceeds on the basis of a complete record as indicated by the block 108. Note that in this instance audio data is registered in the cell 34 (FIG. 2) specifically in voice fields 126. Consequently, the junction block 110 (FIG. 3, lower right) indicates the presence of audio data with the result that the cell register 34 stores a class "1" bit to indicate the order data includes audio data.

Returning to the block 118 (FIG. 3, upper left) the operation for the case of a complex address change involves setting the operating state "3", i.e. actuating a live interface. Other patterns also may lead to that operating sequence. For example, as suggested above, patterns for a line operator interface may include a non-local account or failure to locate an account. Also, throughout the interval of an interface, a caller may prompt a direct personal contact simply by depressing the telephone button designated "*". Accordingly, as indicated in FIG. 3 at block 118, the occurrence of an asterisk signal (*) sets state "3" with operation proceeding from block 118 to activate a live interface as indicated by the block 128. The controller also may initiate state "3" as when meaningless data is received.

It is noteworthy that in an operating system, at any specific time, the demand for operators may exceed the number of operators. In that event, callers who cannot be accommodated are cued to punch in their telephone numbers and/or other data, and/or record via audio or numeric signals such data as to return calls when operators are available. The logic of such an operation is embodied in the block 128, "actuate live interface".

Once an operator contact has been established several possibilities exist. One possibility is that the operator completes the contents of the cell register 34 (FIG. 2) without audio data. Essentially, an operator, active at one of the attended terminals AT1-ATn (FIG. 1) has direct control of the cell register 34 (through the controller 46, FIG. 2) and may be able to enter digital data manifesting the order. That possibility is indicated by the junction block 130 (FIG. 2), "digital data complete?" If the data can be completed without audio, the system operation proceeds to the block 108 (record complete).

If the order is not completed void of audio data, operation proceeds in state "3". Again, under control of a live operator, the system may follow different paths to produce an ultimate determination of whether or not the audio data provides a complete order as indicated by the decision block 134. In that regard, an operator may perfect an order record on the basis of a bank credit card or a new customer accommodation. In any event, if an order is not completed, the operation simply terminates as indicated by the block 136. Conversely, a completed order returns operation to block 108 indicating the record is complete.

Exemplary operating patterns of interfaces are treated in detail below; however, it will now be apparent that the system of the present invention cues a remote terminal, as with voice instructions to prompt: (1) control signals, (2) digital data signals and (3) audio signals. Depending on the control signals, various patterns are selected with the objective of completing data in the cell register for subsequently processing the individual order. Of course, the processing generally includes shipping merchandise and billing the customer.

Consider now a detailed exemplary operation with the attendant operations in the structures of FIGS. 1 and 2 to accomplish the process as illustrated in FIG. 3. Preliminarily, assume the system is programmed to process orders from XYZ COMPANY for items of merchandise identified to customers as from catalog, newspaper or other advertising. Established customers of the XYZ COMPANY are identified by customer number, telephone number, name and address in the master control and memory unit 24 (FIG. 1). Assume initially that such a customer actuates the telephone terminal T1 to accomplish an interface through: the communication system CO, one of the audio response units AR1-ARn and the coupler 22 with one of the interface format processors IP1-IPn.

Note that the initial contact may be variously implemented. For example, call signals provided to an audio response unit AR1-ARn may include representations of the caller's number and accordingly access a file on the caller. Recognizing the various possibilities, assume that at the outset of the interface, the voice generator 44 (FIG. 2, upper left) is actuated by the process controller 46 to greet the caller. For example, the voice generator 44 might cue the caller as follows: "Thank you for calling XYZ COMPANY telephone merchandise service. Please push three buttons on your telephone to identify your first item by catalog number."

Signals representative of three decimal digits identifying an item are supplied from the line 42 (FIG. 2, upper left) to the multiplexer 52. As the status register 56 is in the "0" state, the signals pass from the multiplexer 52 through the moving contact 64 and the stationary contact C1 to be registered in field 82, "item".

In the illustrative format, the customer next is prompted to digitally enter data indicating choices of color, size, special code and so on. For receiving such data, the gate control 66 actuates the gating network 62 in synchronism with the cue to the second position so that the item data is provided through the contact C2 to the field 84. Following a similar pattern, the caller may identify several item designations which are registered in fields 82 and 84 of the cell register 34. Note that items are checked in relation to inventory by the controller 46 acting through the unit 24 (FIG. 1) and the associated inventory look-up table 25.

When the caller indicates entry of the last item (as by an interval of silence or a signal) the voice generator 44 is actuated by the controller 46 to cue for the method of payment. Specifically, for example, the caller might be cued: "If you wish this order billed to your XYZ COMPANY credit card, please push '1'. Otherwise, push '2'." Accordingly, the process controller 46 sets up the process of FIG. 3 to proceed from the decision block 90.

Assuming the caller possesses a credit card of XYZ COMPANY, the voice generator 44 (FIG. 2) states a request (cues) for the number. For example: "Please use your telephone buttons to key in your card number." In synchronism with the cue, the gating network 62 is set. Accordingly, signals representative of the digits forming the card number are received through the line 42 (FIG. 2, upper left), the multiplexer 52 and the line L1 to the gating network 62 (lower left). As the gate control 66 is driven by the process controller 46 setting the movable contact 64 on the stationary contact C4, the customer's number is stored in the field 98.

The customer's number is then utilized to address the processor controller 46 for record data to load other fields, e.g. fields 150, 152, 154, etc. Generally, if a record for the customer's card is located in the unit 24 (FIG. 1), the information is returned via the bus 36 (FIG. 2, right center) and registered in the cell register 34. In the disclosed embodiment, the data includes the expiration date of the card placed in field 150, the customer's telephone number set in field 152 and the customer's name and address set in the field 154. The telephone number may be useful if a live interface is prompted or it may be used as an address to locate a particular file or data.

Considering the operations in detail, the location of a customer's record prompts the controller 46 (FIG. 2) to actuate the gate control 66 setting the movable contact 64 in sequence at the contacts C5, C6 and C7. In synchronism with the customer's card expiration date, telephone number and address are supplied to the fields 150, 152 and 154. Somewhat concurrently, the customer's address is supplied from the controller 46 to actuate the voice generator 44. Consequently, as indicated above, the caller might be prompted as follows: "According to our records, you are Mr. John Henry with a billing and shipping address of 10 Beverly, Los Angeles, Calif. If our information is correct, please push '1'; if not, please push '2'." This operation is symbolized in FIG. 3 by the block 106 (right center).

Of course, the confirmation of a customer can be broken into smaller communications if desired. Note that in cueing the caller for confirmation, the status register 56 is set to manifest state "1" indicating that control signals are being cued. Consequently, the response from the caller is passed through the multiplexer to line L1 and then to the process controller 46. If the caller indicates the information is correct, the process controller actuates the gate control 66 to set the movable contact 64 at the stationary contact C10. The operation of completing the record then involves providing an acknowledgement number through the contact C10 to the field. The acknowledgement number may also be communicated to the caller by the process controller actuating the voice generator 44.

As the final step in the sequence, the movable contact 64 is actuated to engage the stationary contact C11 through which the process controller 46 supplies a signal indicative of binary "0" manifesting that the order data does not include an audio component.

With the order complete, the contents of the cell register 34 is transferred through the bus 36 to the master control and memory unit 24. As indicated above, subsequent processing involves off-line operations to implement filling the order and billing the charges.

To illustrate an alternate course in the process, assume that the customer has a valid credit card record with the XYZ COMPANY; however, the address of record is incorrect. The operation in processing an interface with such a customer would be as indicated above except that the junction represented by the block 106 (FIG. 3, right center) would determine an incorrect address. Consequently, with the system in state "1", a control signal manifesting an incorrect address is supplied through the line L1 to the process controller 46 setting up an alternate operation. Specifically, the next step involves determining whether the verification failure may be corrected by a mere change of address as indicated by the block 120 (FIG. 3). To implement the operation, the process controller 46 (FIG. 2) actuates the voice generator 44 to cue the caller for control signals. For example, the cue may be stated: "If it is simply a matter of correcting or changing your address, please push '1'. Otherwise, push '2'."

If the caller actuates the "1" button, a control signal is provided through the multiplexer 52 and the line L1 to the process controller 46 indicating a simple address correction. As a result, the process controller 46 sets the status register 56 to state "2" (see block 122, FIG. 3). As a consequence, in the system of FIG. 2, the input path 42 is coupled through the multiplexer 52 to the line L2 for supplying audio signals to the audio signal processor 60. Note that during this phase of operation, the process controller 46 actuates the gate controller 66 to set the movable contact 64 at the stationary contact C8 or C9 for recording audio data in the voice fields 126.

In the configuration as described, on cue, the oral statement of the caller's address is provided as an analog signal which may be variously transmitted through the communication facility CO (FIG. 1) to ultimately reach the line 38 (path 42) (FIG. 2, upper left). From the path 42, the representative analog signal is supplied through the multiplexer 52 and the line L2 to the audio signal processor 60 which may variously process the data and encodes the analog signals in a digital format. Accordingly, digital signals indicative of the caller's correct address are registered in the fields 126 of the cell register 34.

With the proper address stored, the customer's record is complete in the cell register 34 and the process proceeds to the operations represented by block 108 (FIG. 3, right center). Specifically, an acknowledgement number is revealed and stored in the field 156 of the cell register 34. As audio signals are involved, the field 112 registers a binary "1" indicative of that class of data cell (audio).

Note that data words stored in the cell register 34 may be variously segregated or processed based on their classification as registered in the field 112. For example, it may be desirable to segregate class "1" and class "0" orders for distinct off-line processing. In that regard, as class "0" orders have no audio data, they involve somewhat simpler process operations in that no human action is involved. Conversely, class "1" orders in the disclosed system are contemplated to involve human processing to convert spoken words to digital data.

To pursue another possible course of operation, assume that prompting or cueing a customer regarding his altered address does not involve a mere change. That is, assume the decision block 120 (FIG. 3, central) produced a control signal manifesting "no", i.e. more than a mere change is involved and a live contact interface is desirable. Upon such an occurrence, state "3" is set as indicated by the block 118 (FIG. 3). As indicated above, several other possibilities may set the operation of state "3". In any event, the status register 56 (FIG. 2) is set by the controller 46 to manifest state "3". Consequently, the status register 56 controls the multiplexer 52 actuating communication through the line L3 to the lines 48 and 50 coupled to one of the attended terminals AT1-ATn (FIG. 1).

In the configuration of state "3", the process controller 46 along with the lines 48 and 50 are linked to one of the attended terminals AT1-ATn enabling an operator to speak directly with a caller and concurrently set data into the data cell register 34 through the controller 46. Note that the attended terminals AT1-ATn include a display and, accordingly, the controller 46 cooperatively drives the display with the cell register to indicate the state of the interface and the caller's data. Thus, unconventional orders are processed with the system in state "3" as described above, the process flowing from the block 118 (FIG. 3, upper left).

Of course, numerous possibilities exist for completing an order with an attended terminal. In that regard, the contents and control of the cell register 34 is by the attended terminal and the problem may simply be one of communication in which case the order data may be completed either with or without audio data.

Recapitulating to some extent, a live interface is prompted from several situations. One case involves the caller depressing the "*" button. Also, if the caller does not have credit with the XYZ COMPANY (not a local account) a live interface is prompted. In that regard, an alternative credit card as a bank card may be employed. Accordingly, data is received in either an audio or non-audio form.

Consider a bank credit card order with reference to FIG. 2 in which the cell register 34 receives alternate information. In this situation, the field 96 may store an indication of an acceptable bank card. Specifically, fields 96, 98 and 150 respectively store a bank card type, the bank card number and the expiration date. It may be further advisable to store the caller's telephone number in field 152. The caller's name and address will be stored; and in that regard, either the field 154 may be utilized by the operator at an attended terminal or an audio record may be keyed for storage in one or more fields 126. If the order is completed by an operator, the system proceeds as explained above with the final steps of indicating an acknowledgement number and designating the class of the order. Thereafter, as in other examples, the contents of the cell register is returned to the master control and memory unit 24 (FIG. 1) for subsequent processing. Note, class "1" orders also may be stored, as in a processor IP1-IPn until completed (without audio data).

It may be seen that the system accomplishes telephonic interfaces utilizing various operations in accordance with control signals prompted by cues from a voice generator. That is, the system alternately may cue a caller to provide: digital data, control data or audio data. Concurrent with the cueing operations, the system assumes a state for compatibly processing responses. Specifically, if control signals are cued, the system is controlled accordingly. If data signals are cued, the system registers such data in either an audio or non-audio format. Furthermore, depending upon the detailed operation of the system, order data is developed as in individual cells for subsequent offline processing. Individual packets or cells of such data are classified as disclosed above, and such classifications may be effectively utilized to segregate or perform various other processing operations.

In view of the above description, it will be apparent that the system of the present invention may be effectively used in telephonic interfaces to accommodate flexibility and control by a caller. Although the disclosed embodiment is directed to a sales operation, it will be apparent that the system may be variously embodied to accommodate any of a variety of telephonic interface operations, e.g. poll, game format, information service and so on. Furthermore, it will be apparent that while the disclosed embodiment comprises specific elements and configurations, any of a variety of structure might well be utilized. Accordingly, the scope hereof is deemed to be as set forth in the claims below.

What is claimed is:

1. A voice-data control system for use with a communication facility including remote terminals for individual callers, wherein said remote terminals may comprise a conventional telephone instrument including voice communication means for providing audio response signals and digital input means for providing digital response signals, said control system comprising:

cue means for cueing select ones of said terminals to prompt selective actuation of said voice communication means and said digital input means to provide responsive signals;

status means to selectively identify responsive signals from each select terminal as digital control signals, digital data signals or audio signals;

control means implementing a stored program to control said cue means and said status means in accordance with said program and said digital control signals to prompt the provision of responsive signals from each select terminal in accordance with said status means; and means for storing responsive signals from said select terminals including digital data signals and audio signals as selectively identified by said status means.

2. A system according to claim 1 wherein said means for storing includes means for forming a data identification flag for distinguishing data including audio signals.

3. A system according to claim 1 wherein said cue means comprises a voice generator.

4. A system according to claim 1 further including manual attended terminal means and wherein said control means further includes means to terminate said program for interfacing a terminal in favor of said attended terminal means.

5. A system according to claim 4 wherein said status means includes means for providing signals to said attended terminal means to manifest.

6. A system according to claim 5 wherein said status means includes means for providing signals to manifest the states of cue data signals, cue control signals and cue audio signals.

7. A system according to claim 1 wherein said means for storing includes plural sections for receiving select data in accordance with said stored program and said control means.

8. A system according to claim 7 wherein said means for storing includes means for storing a flag to indicate the presence of audio data.

9. A system according to claim 8 wherein said means for storing includes means for storing identification data for a caller.

10. A system according to claim 8 wherein said means for storing includes means for storing other data for a caller.

11. A system according to claim 8 wherein said means for storing includes means for storing audio data from a caller.

12. A system according to claim 8 wherein said means for storing includes means for storing acknowledgement data provided from said control means.

13. A system according to claim 1 wherein said cue means comprises a plurality of voice generators and said status means comprises a plurality of registers.

14. A voice-data control system for use with a communication facility including remote terminals for individual callers, wherein said remote terminals may comprise a conventional telephone instrument including voice communication means for providing audio response signals and digital input means for providing digital response signals, said control system comprising:

cue means for cueing select ones of said terminals to prompt selective actuation of said voice communication means and said digital input means to provide responsive signals;

status means to selectively identify responsive signals from each select terminal as digital control signals, digital data signals or audio signals;

memory means for storing individual caller data;

means for retrieving individual caller data from said memory means in response to control signals from said digital input means;

means for storing digital data signals from said digital input means as additional individual caller data;

control means for actuating said cue means and said status means to cue and identify audio signals, said control means being conditioned on the failure of said means for retrieving individual caller data to actuate said cue means whereby said caller provide audio signals representative of caller data; and means for storing said audio signals representative of caller data responsive to cueing by said cue means.

15. A system according to claim 14 wherein said caller data includes caller billing information.

16. A voice-data control system for use with a communication facility including remote terminals for individual callers, wherein said remote terminals may comprise a conventional telephone instrument including voice communication means for providing audio response signals and digital input means for providing digital response signals, said control system comprising:

cue means for cueing select ones of said terminals to prompt selective actuation of said voice communication means and said digital input means to provide responsive signals;

status means to selectively identify responsive signals from each select terminal as digital control signals, digital data signals or audio signals;

control means implementing a stored program to control said cue means and said status means in accordance with said program and said digital control signals to prompt responsive signals from each select terminal in accordance with said status means, said program implementing a mail order operation; and means for selectively storing responsive signals from said select terminals including digital data signals and audio signals as selectively identified by said status means to indicate data and mail orders by said callers for specific items of merchandise.

17. A system according to claim 16 wherein said means for storing signals stores signals representative of billing information.

18. A system according to claim 17 wherein said control means further implements inventory means to account for said items of merchandise.

19. A system according to claim 18 wherein said inventory means includes an inventory record of said items of merchandise.

* * * * *

UNITED STATES PATENT AND TRADEMARK OFFICE
CERTIFICATE OF CORRECTION

PATENT NO. : 5,073,929
DATED : December 17, 1991
INVENTOR(S) : Ronald A. Katz

It is certified that error appears in the above-identified patent and that said Letters Patent is hereby corrected as shown below:

Column 6, line 31, delete "25".

Column 13, line 17, after "manifest" insert --said response signal--;

Column 13, line 33, delete "other" and substitute therefor --order--.

Signed and Sealed this

Thirteenth Day of April, 1993

Attest:

STEPHEN G. KUNIN

*Attesting Officer*   Acting Commissioner of Patents and Trademarks

UNITED STATES PATENT AND TRADEMARK OFFICE
CERTIFICATE OF CORRECTION

PATENT NO. : 5,073,929
DATED : December 17, 1991
INVENTOR(S) : Ronald A. Katz

It is certified that error appears in the above-indentified patent and that said Letters Patent is hereby corrected as shown below:

Column 13, line 17, after "manifest", insert --said response signals--;

Signed and Sealed this

Twenty-third Day of November, 1993

Attest:

BRUCE LEHMAN

*Attesting Officer*  *Commissioner of Patents and Trademarks*